United States Patent [19]
Poradish et al.

[11] Patent Number: 5,650,832
[45] Date of Patent: Jul. 22, 1997

[54] MULTIMODE COLOR WHEEL FOR DISPLAY DEVICE

[75] Inventors: Frank J. Poradish, Plano; James M. Florence, Richardson, both of Tex.

[73] Assignee: Texas Instruments Incorporated, Dallas, Tex.

[21] Appl. No.: 489,881

[22] Filed: Jun. 13, 1995

[51] Int. Cl.[6] .................. H04N 9/12; H04N 9/31
[52] U.S. Cl. .............. 348/743; 348/760; 348/761; 348/764
[58] Field of Search ............ 348/70, 268–270, 348/271, 742, 743, 759, 760, 761, 764, 766, 770, 771; H04N 9/31, 5/74, 9/12

[56] References Cited

U.S. PATENT DOCUMENTS

| | | | |
|---|---|---|---|
| 4,197,559 | 4/1980 | Gramling | 348/743 |
| 5,007,408 | 4/1991 | Ieoka | 348/70 |
| 5,079,544 | 1/1992 | DeMond et al. | 340/701 |
| 5,233,385 | 8/1993 | Sampsell | 355/35 |
| 5,357,288 | 10/1994 | Hiroshima | 348/744 |
| 5,448,314 | 9/1995 | Heimbuch | |
| 5,452,018 | 9/1995 | Capitant | 348/651 |
| 5,452,024 | 9/1995 | Sampsell | |
| 5,526,051 | 6/1996 | Gove | |

*Primary Examiner*—John K. Peng
*Assistant Examiner*—Sherrie Hsia
*Attorney, Agent, or Firm*—Julie L. Reed; James C. Kesterson; Richard L. Donaldson

[57] ABSTRACT

A color wheel assembly (15, 15a, 15b) for use in a display system (10) that uses a beam of source illumination to generate images with a display device. The color wheel (15) is moveable in and out of the path of the source beam so as to provide varying levels of brightness or color saturation. The color wheel (15') may also have concentric rings (41, 43) for varying saturation or color balance.

18 Claims, 1 Drawing Sheet

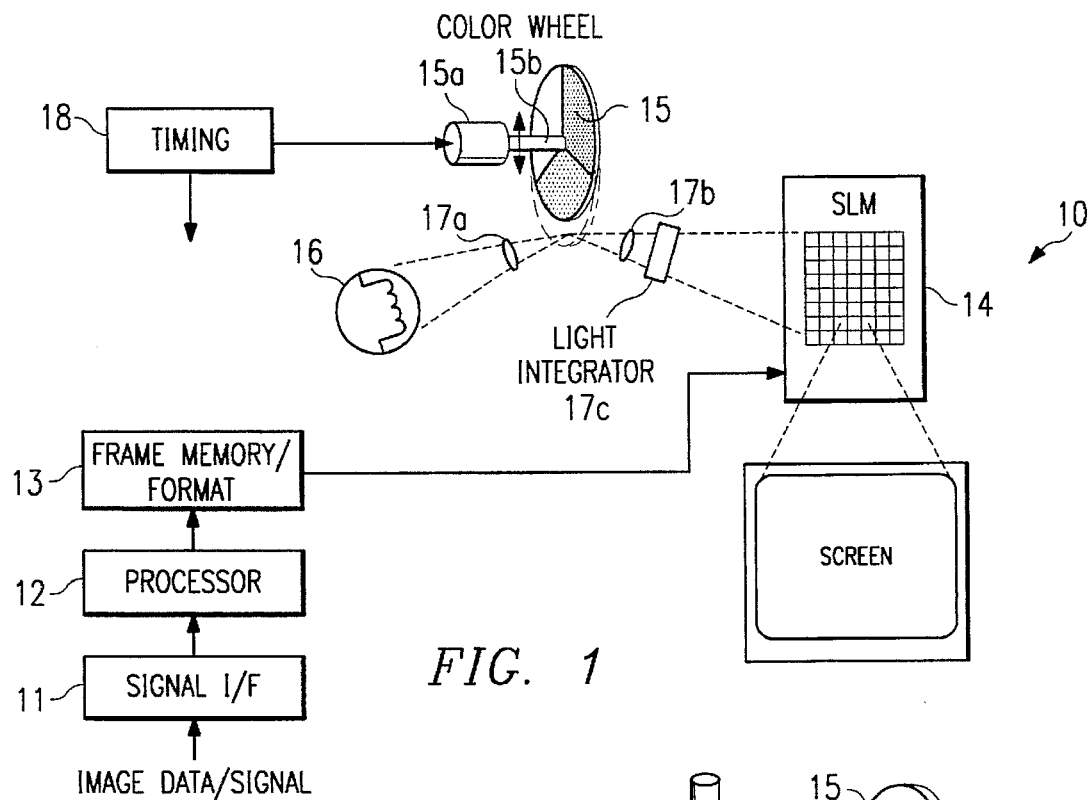
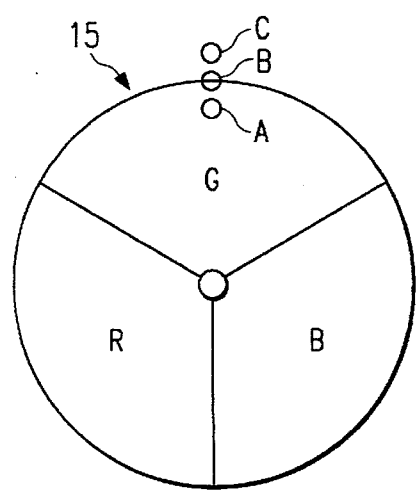
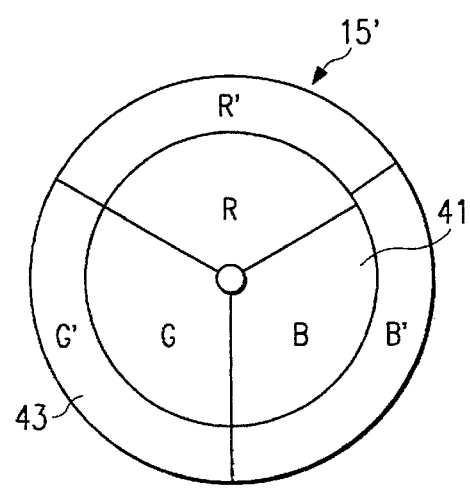

MULTIMODE COLOR WHEEL FOR DISPLAY DEVICE

TECHNICAL FIELD OF THE INVENTION

This invention relates to image display systems, and more particularly to digital image display systems that use a sequential color filter.

BACKGROUND OF THE INVENTION

Image display systems based on spatial light modulators (SLMs) are an alternative to image display systems based on cathode ray tubes (CRTs). SLM systems provide high resolution without the bulk of CRT systems.

Digital micro-mirror devices (DMDs) are one type of SLM, and may be used for either direct view or for projection displays. A DMD has an array of hundreds or thousands of tiny tilting mirrors, each of which provides light for one pixel of an image. To permit the mirrors to tilt, each mirror is attached to one or more hinges mounted on support posts, and spaced by means of a fluidic (air or liquid) gap over underlying control circuitry. The control circuitry provides electrostatic forces, which cause each mirror to selectively tilt. For display applications, image data is loaded to memory cells of the DMD and in accordance with this data, mirrors are tilted so as to either reflect light to, or deflect light from, the entrance pupil of a projection lens and then to an image plane.

One approach to providing color images in an SLM display system is referred to as "sequential color". All pixels of a frame of the image are sequentially addressed with different colors. For example, each pixel might have a red, a green, and a blue value. Then, during each frame period, the pixels of that frame are addressed with their red, green, then blue data, alternatingly. For this type of system, one type of sequential color filter is a color wheel having three segments of these same colors is synchronized to the data so that as the data for each color is displayed by the SLM, the light incident on the SLM is filtered by the color wheel. Another type of sequential color filter is a liquid crystal color modulator, which has a stack of liquid crystal and polarizing layers. These layers are conFIGUREd and controlled so that only one color passes at a given time. For standard display rates, such as the 30 frame per second NTSC rate, the eye perceives the image as having the proper color.

A problem with existing sequential color filters, such as color wheels and liquid crystal color filters, is that they provide color at the expense of brightness. To generate a saturated primary color such as red, green, or blue, two-thirds of the total useable light from a white light source is wasted.

SUMMARY OF THE INVENTION

One aspect of the invention is a method of providing different color saturation levels for an image. The image is formed by modulating or otherwise varying the intensity of pixels illuminated by a beam of source illumination. A color filter, such as a color wheel or a liquid crystal color modulator, is movable in a transverse direction that is substantially perpendicular to the path of the source beam. By moving the color filter so that it is out of the path of the source beam, a greyscale image with maximum brightness is provided. Moving the color filter so that the source beam's path is entirely intersected by the color filter results in an image with fully saturated colors. If the edge of the color filter only partly intersects the source beam's path, the image is partially filtered and is brighter but its colors are less saturated.

An advantage of the invention is that it provides a significant performance improvement in terms of display brightness. For certain displays, such as foils, data, and charts, brightness may be more important than color saturation. The invention provides greyscale images with three to four times as much brightness as its color images. For color images, the invention permits selection of a desired balance between color saturation and brightness for a particular image. Graphics software can be adapted so that color filter placement and the resulting saturation level can be software controlled.

BRIEF DESCRIPTION OF THE DRAWINGS

FIG. 1 is a block diagram of a display system having a color filter that is movable in accordance with the invention.

FIG. 2 illustrates three different positions of the color wheel with respect to the path of the source illumination.

FIG. 3 illustrates an alternative embodiment of the color wheel assembly, where the entire color wheel assembly is movable.

FIG. 4 illustrates an alternative embodiment of the color wheel for providing discrete saturation levels.

DETAILED DESCRIPTION OF THE INVENTION

Display System Overview

The following description is in terms of a display system that displays images generated by an SLM or other pixel array display device. The term "pixel array display device" is used in a broad sense to include any type of array that generates a display using individually addressed pixels. Thus, for example, the display device might be a liquid crystal array. However, the invention is not limited to such devices, and could be used with any display system that uses a color wheel for sequential color displays. For example, the data described herein could be converted to an analog signal for use by a white light CRT whose images are filtered by a color wheel.

FIG. 1 is a block diagram of a typical SLM-based image display system 10 that uses a color wheel 15 in accordance with the invention. As explained below, the invention is directed to moving color wheel 15 so that its filter segments are totally within the light path from source 16, partially in the light path, or completely removed from the light path.

As indicated in the Background, a color wheel is only one type of sequential color filter. Another type is a liquid crystal light modulator. As with a color wheel, only a certain color passes through the liquid crystal light modulator at any given time, in synchronization with the pixel data. Although the following description is in terms of a color wheel, the same concepts apply to moving any type of sequential color filter with respect to the light path from the source, so that all, none, or part of the light is filtered.

The following overview of the various components of display system 10 provides details helpful to understanding of the invention. Further details pertaining to a DMD-based image display system with other types of color wheels are set out in U.S. Pat. No. 5,079,544, entitled "Standard Independent Digitized Video System"; In U.S. Pat. No. 5,526,061, entitled "Digital Television System"; and in U.S. Pat. No. 5,452,024, entitled "DMD Display System"Further details describing the general operation of color wheels for SLM-based display systems are set out in U.S. Pat. No. 5,233,385, entitled "White Light Enhanced Color Field Sequential Projection"; U.S. Pat. No. 5,448,314, entitled "Method and Apparatus for Sequential Color Imaging"; and U.S. Pat. Ser. No. 08/339,379, abandoned entitled "Digital Motor Controller for Color Wheel." Each of these patents and patent applications is assigned to Texas Instruments Incorporated, and each is incorporated herein by reference.

Signal interface 11 receives some kind of input signal. For purposes of example herein, it will be assumed that the input signal is a standard analog video signal having horizontal and vertical synchronization components. However, in other systems, the input signal might be graphics data already in digital form.

In the case of a video input signal, interface 11 separates the video signal from synchronization and audio signals. It includes an A/D converter and a Y/C separator, which convert the data into pixel data samples and separate the luminance data from the chrominance data. The signal could be converted to digital data before Y/C conversion or Y/C separation could occur before digitization.

Pixel data processor 12 prepares the data for display, by performing various processing tasks. Processor 12 includes processing memory for storing pixel data during processing. The tasks performed by processor 12 may include linearization, colorspace conversion, and line generation. Linearization removes the effect of gamma correction, which is performed on broadcast signals to compensate for the non-linear operation of CRT displays. Colorspace conversion converts the data to RGB data. Line generation can be used to convert interlaced fields of data into complete frames by generating new data to fill in odd or even lines. The order in which these tasks are performed may vary.

Display memory 13 receives processed pixel data from processor 12. Display memory 13 formats the data, on input or on output, into "bit-plane" format and delivers the bit-planes to SLM 14. The bit-plane format provides one bit at a time for each pixel of SLM 14 and permits each pixel to be turned on or off in accordance with the weight of that bit. For example, where each pixel is represented by n bits for each of three colors, there will be 3 n bit-planes per frame. Bit-planes containing less significant bits will result in shorter display times than the bit-planes containing more significant bits. A pixel value of 0 (black) results in the pixel being off for that color during the frame. For each color, each mirror element of the SLM 14 can be "on" for a duration of anywhere from 1 LSB period to $2^n-1$ LSB periods. In other words, each color has $2^n-1$ time slices, during which any pixel can be on for any number of time slices between 0 and $2^n-1$.

In a typical display system 10, memory 13 is a double-buffer memory, which means that it has a capacity for at least two display frames. The buffer for one display frame can be read out to SLM 14 while the buffer or another display frame is being written. The two buffers are controlled in a "ping-pong" manner so that data is continuously available to SLM 14.

SLM 14 may be any type of SLM. For purposes of example, this description is in terms of a display system whose SLM 14 is a digital micro-mirror device (DMD). However, as stated above, the same concepts apply to display systems that use other types of SLMs or other image generating devices.

Light incident on SLM 14 is provided by a light source 16 and is transmitted through a rotating color wheel 15. Lens 17a focusses the source illumination, in the form of a source beam, to a "spot size" at the plane of the color wheel 15. Lens 17b directs the light to SLM 14, and as explained below, a light integrator 17c provides color uniformity.

A typical size of color wheel 15 is approximately 4 inches in diameter for incident light having a spot size of 4–6 millimeters. This size is sufficiently large so as to minimize the time when the incident light coincides with a transition between filter segments of color wheel 15.

In the example of FIG. 1, color wheel 15 has three filter segments, each of a different primary color. For purposes of example herein, these colors are red, green, and blue. In alternative embodiments, other colors could be used and fewer or more than three colors could be used. Also, there could be more than one segment for each color. The segments need not be exactly the same size, depending on the desired color balance.

As explained in the Background the data for each color are sequenced and the display of the data is synchronized so that the portion of color wheel 15 through which light is being transmitted to SLM 14 corresponds to the data being displayed. In the example of this description, each pixel is represented by RGB data, which means that each pixel has a red value, a green value, and a blue value. As the values for each color of all pixels in a frame are being displayed, color wheel 15 rotates so that the light is transmitted through the corresponding red, blue or green filter. For each pixel, the combination of these three values is perceived as the desired color.

Color wheel 15 is attached to a rotating shaft 15b, which is driven by motor 15a, causing color wheel 15 to rotate. A motor controller controls the speed and phase of color wheel 15. For example, the desired speed might be 60 revolutions per second to correspond to a 60 frame per second display rate. The phase is set so that the proper filter (red, green, or blue) of color wheel 15 is transmitting light from SLM 14 as the data for that filter is being displayed. To maintain a correct phase relationship between the color wheel 15 and the data being displayed, the color wheel 15 can speed up or slow down or the data can be delayed or skipped. Where a frame of data is displayed for a frame period of T seconds, color wheel 15 has a period of revolution of T seconds.

Master timing unit 18 provides various system control functions. One timing signal provided by master timing unit 18 is a signal defining the display times for each bit weight of the pixel value.

Although not illustrated in FIG. 1, system 10 also includes a projection lens and various other optical devices for collecting and projecting the image from SLM 14 to the image plane (screen).

As indicated in FIG. 1, color wheel 15 is transversely moveable in the direction of its own plane. The direction of this transverse motion of color wheel 15 is in a plane substantially perpendicular to the light path of the source beam. This permits color wheel 15 to be moved in or out of the path of the light from source 16. In FIG. 1, this motion is implemented by making shaft 15b moveable in one dimension, in a direction substantially parallel to the plane of color wheel 15.

In FIG. 1, the transverse motion of color wheel 15 causes its outer edge to move within the light path of the source beam. Other equivalent configurations are possible, such as a color wheel having a ring-shaped clear gap, whose edge is moved in and out of the light path. In general, color wheel 15 has some sort of circular perimeter that is movable with respect to the light path as a result of transverse motion of the color wheel.

FIG. 2 illustrates three positions of color wheel 15 with respect to the light path of the source beam. The light path is indicated by the spot size of the source beam, at positions A, B, and C.

When color wheel 15 is in the light path such that it filters all of the light reaching SLM 14 (position A), color wheel 15 is in its "full color" mode. However, when color wheel 15 is out of the light path such that it does not filter any of the light reaching SLM 14 (position C), color wheel 15 is in a "black and white" mode. Greyscale is provided by modulating (in the case of an SLM) or otherwise controlling the intensity of each pixel. Removing the color wheel 15 from the light path in this manner can provide in excess of three times the light as the full color mode.

Between the full color mode and the black and white mode, color wheel 15 can be moved along its transverse path in an infinite number of positions (eg., position B). In this manner, the light can be partially filtered along the edge of color wheel 15. For each position, a certain percentage of the light is filtered and a certain percentage of the light remains white light (or whatever other color of light is provided by source 16). This permits display system 10 to provide an infinite range of color strengths. As less of the beam of source illumination is filtered by color wheel 15, the colors of the image are less saturated but are brighter. To ensure proper uniformity of the light after it is filtered, various optical devices, such as an integrator 17c, may be placed in the light path after color wheel 15 but before the source beam reaches SLM 14.

The transverse motion of color wheel 15 may be continuous or it may be stepped. Stepped motion in a discrete number of color saturation levels to be specified and matched.

FIG. 3 illustrates an alternative embodiment, in which the entire color wheel assembly, including color wheel 15, motor 15a, and shaft 15b, are transversely moveable. The same concepts as discussed above apply, such that by moving the color wheel assembly, the edge of the color wheel 15 can be placed entirely or partly in the light path or entirely out of the light path. As discussed above, this permits the amount of light to be filtered and hence its saturation, to be varied.

In the example of FIG. 3, the transverse motion is afforded to the color wheel assembly by placing motor 15a on a track 31. It can be moved along this track 31 and once a desired position is obtained, locked into place for operation. The position of color wheel 15, whether it is moved with only shaft 15b or with the entire color wheel assembly, can be by manual operation, or in more complex embodiments, could be automatic. For automatic motion, some sort of additional motor (not shown) would be provided. Graphics software can be adapted to provide signals for automatic positioning.

FIG. 4 illustrates a color wheel 15', which is also transversely moveable, but has concentric rings 41 and 43 of different filters. A first filter ring 41 is comprised of filters having one set of color saturation values. The resulting colors are R, G, and B. A second filter ring 43 has filters with one or more different color saturation values. Here, all the saturation values are different, and the resulting colors are R', G', and B' Depending on the position of color wheel 15' along its transverse path, one or the other filter ring 41 or 43 filters the light. Or, color wheel 15' can be completely removed from the light path for greyscale images.

Like color wheel 15, color wheel 15' provides a choice of more saturated colors with less intensity or less saturated colors that are brighter. But color wheel 15' is especially designed for discrete levels so that color coordinates can be matched. For example, a software "palette" might permit the user to select a color saturation level. The user's selection can then result in a known position of color wheel 15' that matches the palette. Although only two rings 41 and 43 are shown, color wheel 15' could have more rings for more saturation versus brightness choices.

As indicated in FIG. 4, the filter sizes need not be proportionally the same for each ring 41 or 43. In FIGURE 4, ring 43 has a larger proportion of blue filter than does ring 41. In fact, the same concepts discussed above could be used to provide a different color balance even where the concentric rings do not vary saturation.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of providing a choice of brightness and color levels for an image formed from a beam of source illumination for a spatial light modulator, comprising the steps of:

using a sequential color filter to filter said beam;

moving said color filter along a transverse path that is substantially perpendicular to the path of said beam, such that all, part, or none of said beam is filtered through said color filter;

providing a light integrator to integrate said light such that said spatial light modulator is illuminated in its entirety by one color at a time.

2. The method of claim 1, wherein said moving step is performed in discrete increments.

3. The method of claim 1, wherein said moving step permits an infinite number of positions of said color filter.

4. The method of claim 1, wherein said color filter is a liquid crystal light modulator.

5. The method of claim 1, wherein said color filter is a color wheel having a substantially round shape and substantially pre-shaped segments for filtering different colors.

6. The method of claim 5, wherein said color wheel has concentric rings with said segments within each ring and wherein a segment of one ring provides a different color saturation than a segment of the same color in a different ring.

7. The method of claim 1, wherein said moving step results in different saturation levels.

8. The method of claim 1, wherein said moving step moves an outer edge of said color filter within said path of said beam, such that only a part of said beam is filtered.

9. A display device using a color wheel assembly for filtering a beam of source illumination fox spatial light modulator, including:

a color wheel having a number of filter segments of different colors, such that said beam can be directed through said color wheel and be filtered by each of said segments sequentially, said color wheel further having a hub;

a shaft for attachment to said hub and to a motor, said shaft being transversely movable with respect to said motor, in a direction substantially parallel to the plane of said color wheel, such that said color wheel can be moved in or out of the path of said beam; and a light integrator for integrating light presented to said spatial light modulator such that said spatial light modulator is illuminated in its entirety by one color at a time.

10. The color wheel assembly of claim 9, wherein said shaft is further moveable such that said color wheel can be moved partly in said path.

11. The color wheel assembly of claim 9, wherein said color wheel has at least three said filter segments of different primary colors.

12. The color wheel assembly of claim 9, wherein said color wheel has concentric rings with said filter segments within each ring.

13. The color wheel assembly of claim 12, wherein a filter segment of one ring provides a different color saturation than a filter segment of the same color in a different ring.

14. A display device using a color wheel assembly for filtering a beam of source illumination for a spatial light modulator, comprising:

a color wheel having at least three filter segments of different primary colors, such that said beam can be directed through said color wheel and be filtered by each of said segments sequentially;

a color wheel motor attached to said color wheel for providing rotational movement to said color wheel;

said motor being movable in a direction substantially parallel to the plane of said color wheel and substantially perpendicular to the path of said beam, such that said color wheel can be moved in or out of the path of said beam; and a light integrator for integrating light presented to said spatial light modulator such that said spatial light modulator is illuminated in its entirety by one color at a time.

15. The color wheel assembly of claim 14, wherein said motor is further moveable such that said color wheel can be moved partly in said path.

16. The color wheel assembly of claim 14, wherein said color wheel has at least three said filter segments of different primary colors.

17. The color wheel assembly of claim 14, wherein said color wheel has concentric rings with said filter segments within each ring.

18. The color wheel assembly of claim 17, wherein a filter segment of one ring provides a different color saturation than a filter segment of the same color in a different ring.

* * * * *